UNITED STATES PATENT OFFICE.

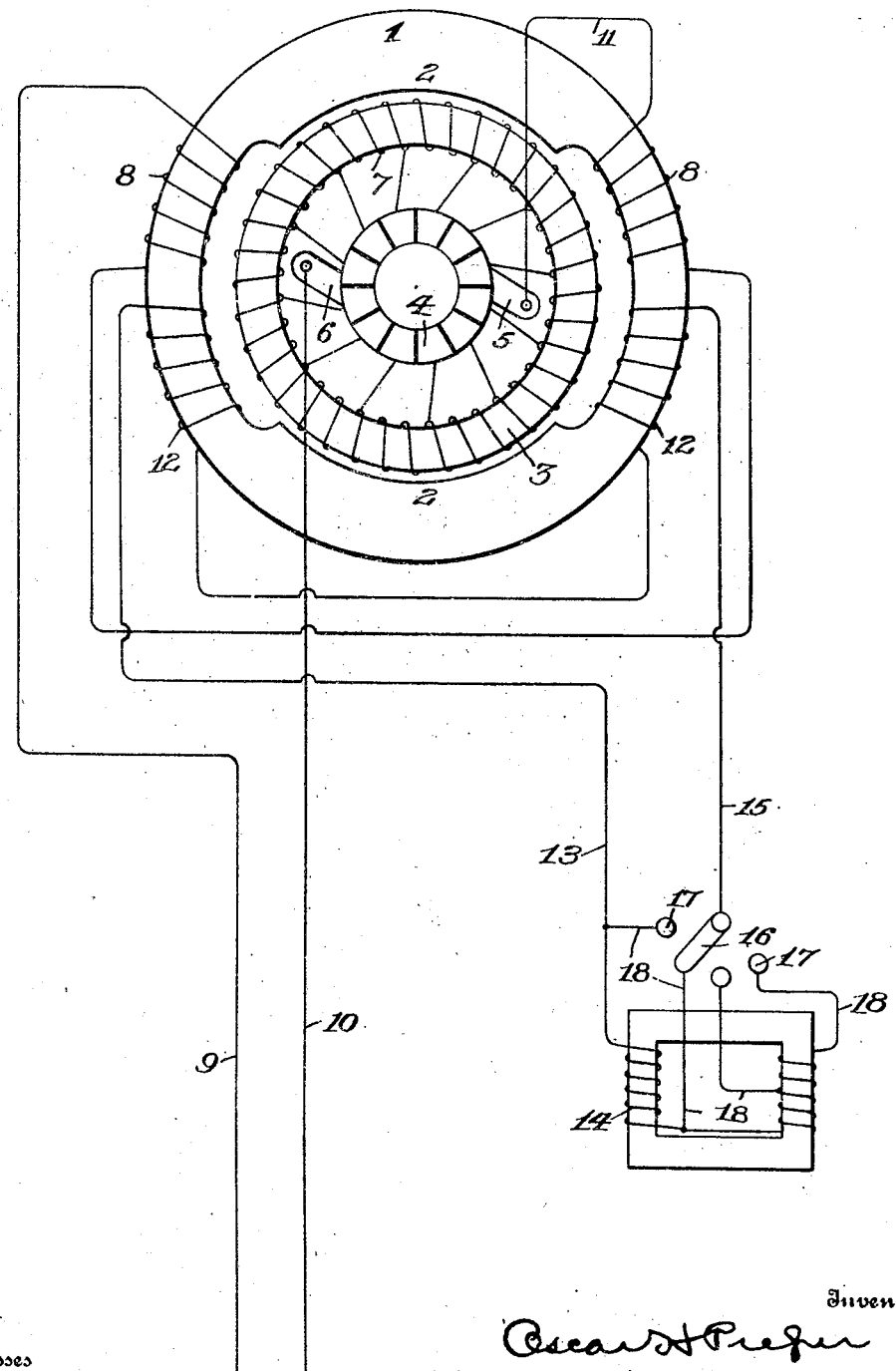

OSCAR H. PIEPER, OF ROCHESTER, NEW YORK.

ELECTRIC MOTOR.

1,050,750.  Specification of Letters Patent.  Patented Jan. 14, 1913.

Application filed October 26, 1905, Serial No. 284,419. Renewed November 22, 1912. Serial No. 732,960.

*To all whom it may concern:*

Be it known that I, OSCAR H. PIEPER, of Rochester, in the county of Monroe and State of New York, have invented certain new and useful Improvements in Electric Motors; and I do hereby declare the following to be a full, clear, and exact description of the same, reference being had to the accompanying drawings, forming a part of this specification, and to the reference-numerals marked thereon.

My present invention relates to alternating current motors of the type in which the field and the armature are arranged in series and it has for its object to provide a method of construction whereby such a motor may be designed to operate at a constant predetermined speed when running without a load, and as a further object to provide means which will enable the speed of an alternating current motor of the type mentioned to be increased or decreased when running free.

To these and other ends the invention consists in certain improvements and combinations of parts, all as will be hereinafter more fully explained, the novel features being pointed out in the claims at the end of the specification.

In the drawings:—the accompanying illustration is a diagrammatic view of a motor constructed in accordance with my invention.

Similar reference numerals in the specification and drawing designate similar parts.

In illustrating my invention I have shown it applied to a motor embodying a field magnet 1 having pole pieces 2 and an armature 3 provided with a commutator 4 with which the brushes 5 and 6 coöperate. The armature windings 7 connected to the several commutator segments may be arranged as usual or in any preferred form.

One terminal of the field coils or windings 8 on the field magnet is connected to a line conductor 9, while the other terminal 11 of the field coil or coils is connected to the brush 5 and the line conductor 10 leads to the brush 6, thus placing the field winding and the armature winding in series. An alternating current motor of the above described type when operated without a load has a tendency for its armature to race or attain an excessively high speed due to the gradually increasing counter electromotive force and consequently decreasing the field magnetism. In order to maintain a substantially constant field magnetism and overcome this fault of racing I provide a field magnet with an inductive winding 12, separate from either the field winding 8 or the armature winding 7 and providing in effect a secondary winding with the main field winding 8 as a primary. A field magnet in a motor of this type with both primary and secondary windings has a substantially constant field flux due to the control of the current or energy in the primary circuit by the inductive or transformer action in the secondary circuit. Such a construction will permit the attainment of any desired speed by suitable proportioning the primary and secondary windings.

In order to provide means for regulating the speed of the motor a variable winding, either inductive or non-inductive, is interposed in the secondary circuit by connecting the terminal 13 thereof to coils 14 and joining the other terminal 15 to a movable switch arm 16 adapted to coöperate with a plurality of contacts 17 connected by wires 18 to various points on the coils 14.

By increasing the inductance of the motor circuit through the medium of the inductive auxiliary or secondary circuit, the phase-lag of the current behind the impressed E. M. F. in the primary circuit is increased. The inductive action between the primary or main field coils and the secondary coils is similar to that of a transformer of the constant current type.

It is known that when the reactance of an alternating current circuit is large compared with the resistance, that the current does not vary greatly with changes of resistance. Moreover, it is also well known that the phase angle of lag in the circuit of a series alternating current motor is reduced by the effect of the counter E. M. F. of the armature which is in phase with the current, and therefore increases the power factor or effective E. M. F.

It will be apparent that by increasing the reactance of the motor circuit and consequently the phase-lag of the current, the latter will remain substantially constant and consequently the field strength will also be maintained substantially constant and will not be materially altered by an increase of the counter E. M. F. generated by the rotation of the armature. For this reason the speed of the armature cannot increase over a certain predetermined amount, which can be varied by cutting in more or less of the coils 14. I have thus provided an effective means of controlling the armature speed of series alternating current motors and preventing racing at no load.

A motor embodying the invention is particularly adapted for dental operations in which the work performed varies greatly requiring a motor susceptible of instant speed changes when running free, without a load, other than the friction of the operating parts in their bearings.

I claim as my invention:

1. In an alternating current motor of the commutator type, the combination with the field magnet and field and armature windings arranged in series, of a highly inductive closed circuit winding on the field magnet arranged in inductive relation to the field windings only.

2. In an alternating current motor of the class described, the combination with a field magnet and the field and armature windings arranged in series, of a secondary winding on the field magnet arranged in a closed circuit and in inductive relation to the field winding so that the induced current in said secondary winding is produced only by current in the main field winding, and an auxiliary reactance coil in said closed circuit.

3. In an alternating current motor of the class described, the combination with the field magnet and the field and armature windings arranged in series, of an inductive winding arranged in a closed circuit on the field, the induced current in said winding being produced only by current in the field winding and serving to maintain a constant magnetic strength in the field magnet, and an auxiliary adjustable reactance coil in said closed circuit.

4. In an alternating current motor, the combination with a field magnet, and field and armature windings arranged in series, of an inductive winding on the field and arranged in a closed circuit having no electrical connection with the field or armature windings, whereby the induced current in said winding is produced only by current in the field winding, and an auxiliary adjustable inductive winding interposed in said closed circuit.

OSCAR H. PIEPER.

Witnesses:
G. WILLARD RICH,
WALTER B. PAYNE.

Copies of this patent may be obtained for five cents each, by addressing the "Commissioner of Patents, Washington, D. C."